United States Patent
Dupont et al.

(10) Patent No.: US 12,428,593 B2
(45) Date of Patent: Sep. 30, 2025

(54) HYDRAULIC FRACTURING FLUIDS AND METHODS OF USE WITH FRICTION REDUCER SLURRY FORMULATION

(71) Applicant: Independence Oilfield Chemicals LLC, The Woodlands, TX (US)

(72) Inventors: Jeffrey Scott Dupont, Conroe, TX (US); Erica Lauren Kuhlman, Conroe, TX (US)

(73) Assignee: INDEPENDENCE OILFIELD CHEMICALS LLC, The Woodlands, TX (US)

( * ) Notice: Subject to any disclaimer, the term of this patent is extended or adjusted under 35 U.S.C. 154(b) by 0 days.

(21) Appl. No.: 17/462,247

(22) Filed: Aug. 31, 2021

(65) Prior Publication Data

US 2022/0064522 A1 Mar. 3, 2022

Related U.S. Application Data

(60) Provisional application No. 63/074,178, filed on Sep. 3, 2020.

(51) Int. Cl.
*C09K 8/92* (2006.01)
*E21B 43/16* (2006.01)
*E21B 43/26* (2006.01)

(52) U.S. Cl.
CPC ............... *C09K 8/92* (2013.01); *E21B 43/16* (2013.01); *E21B 43/26* (2013.01)

(58) Field of Classification Search
CPC ............ C09K 8/92; E21B 43/26; E21B 43/16
See application file for complete search history.

(56) References Cited

U.S. PATENT DOCUMENTS

| | | | |
|---|---|---|---|
| 5,124,376 A | 6/1992 | Clark, Jr. | |
| 8,304,377 B2 | 11/2012 | Yu et al. | |
| 9,315,722 B1 | 4/2016 | Jackson et al. | |
| 10,767,104 B2 * | 9/2020 | Do | C09K 8/584 |
| 11,001,744 B2 * | 5/2021 | Mukherjee | C09K 8/594 |
| 11,203,709 B2 * | 12/2021 | Nguyen | C09K 8/845 |
| 2001/0056149 A1 | 12/2001 | Powell | |
| 2005/0143506 A1 | 6/2005 | Harrington et al. | |
| 2007/0187711 A1 | 8/2007 | Hsiao et al. | |
| 2008/0275138 A1 | 11/2008 | Ridley et al. | |
| 2010/0305008 A1 | 12/2010 | Dino et al. | |
| 2011/0245114 A1 * | 10/2011 | Gupta | C09K 8/882 507/224 |
| 2016/0122626 A1 * | 5/2016 | Dwarakanath | C09K 8/584 166/305.1 |
| 2017/0096597 A1 * | 4/2017 | Hu | C09K 8/602 |
| 2018/0320060 A1 * | 11/2018 | Holtsclaw | C09K 8/86 |
| 2019/0211255 A1 | 7/2019 | Tellakula | |
| 2019/0233715 A1 | 8/2019 | Alexis et al. | |
| 2019/0241796 A1 * | 8/2019 | Mast | C09K 8/905 |
| 2020/0181481 A1 * | 6/2020 | Dawson | C09K 8/88 |

FOREIGN PATENT DOCUMENTS

| | | | |
|---|---|---|---|
| EP | 3556823 A1 | 10/2019 | |
| WO | 2017187150 A1 | 11/2017 | |
| WO | 2018045282 A1 | 3/2018 | |
| WO | 2019046198 A1 | 3/2019 | |
| WO | 2019152467 A1 | 8/2019 | |

OTHER PUBLICATIONS

International Search Report for PCT/GB2021/052250 mailed Dec. 10, 2021 (14 pages).

* cited by examiner

*Primary Examiner* — Silvana C Runyan
(74) *Attorney, Agent, or Firm* — John A. Smith; Shumaker, Loop & Kendrick, LLP

(57) ABSTRACT

A method of preparing a fracturing fluid for hydraulic fracturing in unconventional reservoirs such as coal beds, sandstones, and shales. The method includes selecting an anionic surfactant, such as an anionic sulphonate surfactant; and contacting the anionic surfactant with a fracturing fluid or with a precursor of said fracturing fluid. The fracturing fluid may further include friction reducing polymers and a booster formulation that provides enhanced polymer performance for increased friction reduction as well as faster polymer dissolution in the fracturing fluid.

23 Claims, 4 Drawing Sheets

HYDRAULIC FRACTURING FLUIDS AND METHODS OF USE WITH FRICTION REDUCER SLURRY FORMULATION

TECHNICAL FIELD

The present invention relates to hydraulic fracturing and particularly, although not exclusively, relates to fracturing fluids and methods using same. Preferred embodiments combine friction reducing polymers and a booster formulation that provides enhanced polymer performance for increased friction reduction as well as faster polymer dissolution in the fracturing fluid.

BACKGROUND

Hydraulic fracturing is a process needed to produce oil and gas from unconventional reservoirs such as coal beds, tight sandstones and shales. In this process, a fracturing fluid is injected at a rate and pressure necessary to cause formation failure by inducing fractures or cracks in the formation. These cracks originate at the well-bore and radiate out into the formation. The common practice in unconventional reservoirs is to initiate entry into the reservoir with a small slug of acid pumped at low rates followed by injection of a low viscosity water pumped at increasing rate until the design pump rate is achieved. These high rates typically can range from 50 to 100 barrels per minute. In order to pump at these high rates, small amounts of friction reducers are added to the fluid. The low viscosity, friction reducer assisted fluids are referred to as slick-water and the process or treatment is referred to as slick-water fracturing.

In hydraulic fracturing, polyacrylamide based polymers are often used to enhance oil and gas recovery. This fracturing process involves using significant quantities of a fracturing fluid with the main fluid being water that is pumped into an oil and/or gas containing formation under pressure to fracture the rock. Contained within the fracturing fluid is proppant. Generally, the proppant used is sand but could be a variety of other particles. The sand becomes trapped within the fractures and holds them open once pressure is reduced. This allows for improved flow of oil and gas from the formation. Polyacrylamide based polymers are used in the fracturing fluid as friction reducers where the polymer reduces turbulent flow of the fluid. This allows for a reduction in pumping pressure and a potential increase in pump rate. This can greatly reduce the cost of operation and time to complete the hydraulic fracturing process. Other components can also be added to the fracturing fluid to enhance performance of the fluid. For example, the fracturing fluid may include corrosion inhibitors, acids, fluid loss control additives, iron control additives, biocides, surfactants, scale inhibitors, clay control additives, foamers, paraffin inhibitors, gelling agents, pH adjustment additives, buffers, cross-linkers, oxidizing agents, enzymes and gel degrading agents.

Polyacrylamide based polymers for use in hydraulic fracturing are generally copolymers that are anionic or cationic charged. One of the more widely used polymers is a copolymer of acrylamide and acrylic acid metal salt. For hydraulic fracturing, the molecular weight of these polymers are very high. High molecular weight polyacrylamide based polymers allow for optimum friction reduction. During application the polymer is mixed with the fracturing fluid that is primarily water based. Preferably, the polymer hydrates and dissolves in water as fast as possible. The fracturing fluid then becomes more resistant to turbulent flow thereby providing friction reduction as it is pumped into the formation.

The most effective polymers have a high % friction reduction and dissolve as fast as possible in the fracturing fluid. A potential problem with using polyacrylamide based polymers is a decrease in friction reduction and/or an increase in dissolution time in the fracturing fluid which can be due to a number of variables. One variable is water quality. This is becoming increasingly important due to the recent trend to re-use fracturing fluid and/or to use the water produced from the formation after a fracturing operation. Not to be bound by theory, one mechanism for reduced performance due to water quality is the increase in divalent ions such as calcium in the fracturing fluid. These ions may bind with the polyacrylamide polymer slowing dissolution and coiling up the polymer, reducing friction reduction and slowing dissolution in the fracturing fluid. Friction reducing booster chemistries are known in the art. WO 2019/046198 A1 describes the use of nonionic surfactants including alkyl phenol ethoxylates as surfactant boosters that can also be called breakers. U.S. Pat. No. 5,124,376 describes the use of phenol at 0.25 to 10 percent to improve inversion times and viscosity of a water soluble polymer. While addition of various chemicals to promote release of these types of polymers are known in the art, many of these chemicals do not provide maximum performance and/or need a high concentration to be effective.

Delivery of polymer compositions to hydraulic fracturing applications can be done in numerous ways. Polymer can be delivered as a powder, an emulsion, a slurry, partially hydrated or already dissolved in water or combinations thereof. Powder polymer, while high in activity, generally needs specialized equipment to hydrate prior to use in a fracturing fluid. Slurry polymer, while lower in activity than powder polymer, can be expensive due to the use of a significant amount of inert fluid to suspend the particles. Polymer invert emulsions may have even lower polymer activity and can still be expensive due to the use of surfactants to stabilize the invert emulsions. Polyacrylamide based polymers already dissolved in water can be very viscous at concentrations above a few percent and would have a significant expense in transportation, storage and handling. WO-2017187150 A1 describes the use of both emulsion and powder polymer together to provide an economical alternative that is easy to handle and pump.

It is an object of the present invention to provide a booster formulation for fracturing fluids that may effectively maximize both friction reduction and minimize time for polymer to dissolve in the fracturing fluid especially under difficult conditions such as when high divalent ion water is used in the fracturing fluid.

SUMMARY

The present invention is based on the surprising discovery that certain surfactants can be incorporated into fracturing fluids to maximize friction reduction, achieve rapid polymer dissolution and/or facilitate the building of viscosity.

According to a first aspect of the invention, there is provided a method of preparing a fracturing fluid (YY), the method comprising:
 (i) selecting an anionic surfactant (AS);
 (ii) contacting the anionic surfactant (AS) with a fracturing fluid (XX) or with a precursor of said fracturing fluid (XX).

DETAILED DESCRIPTION

Figure 1:
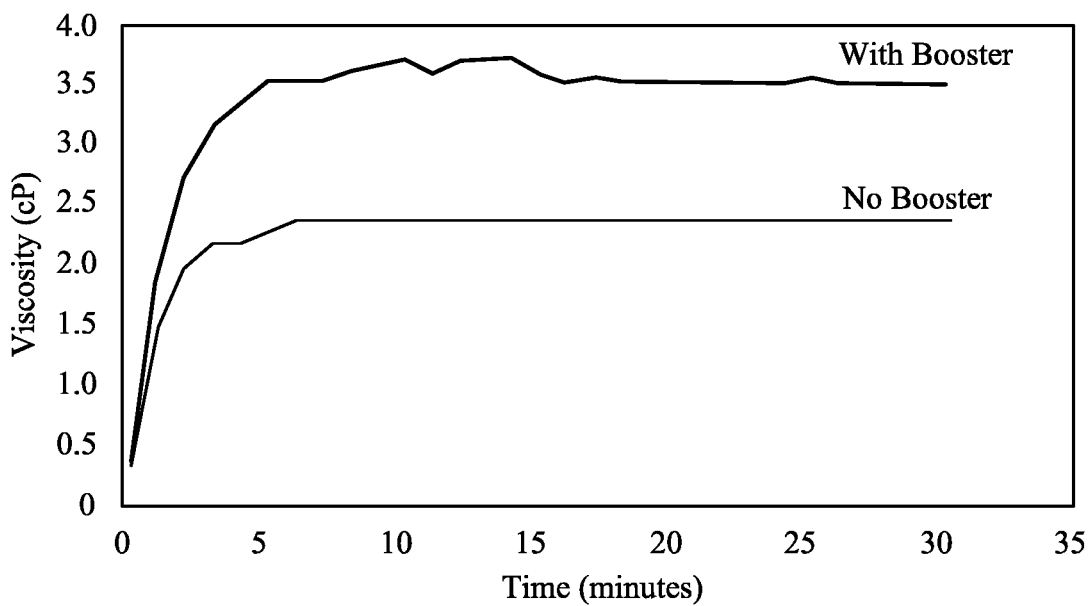
FIG. 1 is viscosity data collected on a Grace 3600 viscometer at 511 s$^{-1}$ at 20° C. in 84K TDS water using 1 gpt polymer and booster (combination of Dodecylbenzene sulfonate, MEA Salt and DPDS).

Unless otherwise stated herein, a reference to "ppm" refers to "parts-per-million by weight"; and "wt %" refers to the % of a component on a weight-for-weight basis.

Fracturing fluid (XX) may incorporate a friction reducer formulation; or the method may comprise a step of selecting a precursor of said fracturing fluid (XX) and contacting the precursor with said friction reducer formulation to produce fracturing fluid (XX).

Before or after step (ii), the method preferably comprises contacting a or said friction reducer formulation with other components included in said fracturing fluid (YY), for example fracturing fluid (XX) or a precursor thereof.

Said friction reducer formulation may include a water-soluble polymer. Said water-soluble polymer may be partially hydrated or provided as a powder. Said friction reducer formulation preferably includes an oil phase.

Said friction reducer formulation may comprise a slurry, for example comprising powder provided in oil; or an emulsion, for example an inverse emulsion and/or a dewatered emulsion; and/or a combination of an emulsion and a said powder slurried in the fluid; and/or a liquid dispersion polymer, for example as described in US20080275138.

Use of anionic surfactant (AS) suitably improves the performance of fracturing fluid (XX). For example, it may advantageously decrease the time it takes for the friction reducer formulation to invert (when the friction reducer is an inverse emulsion); and/or decrease the time it takes for the friction reducing polymer to hydrate; and/or increase the performance of the friction reducing polymer; and/or increases the viscosity of the fracturing fluid (XX) and/or (YY).

Said friction reducer formulation preferably comprises a water-soluble polymer (B), preferably in combination with an oil phase.

Said polymer (B) preferably includes an optionally-substituted acrylamide repeat unit. It may include a 2-Acrylamido-2-methylpropane sulfonate (AMPS)-based monomer. Preferably, said polymer (B) is an ionic polyacrylamide. Polymer (B) may include 0-50 mol %, preferably 5-40 mol %, more preferably 10-30 mol % of ionic repeat units. The balance suitably comprises non-ionic acrylamide repeat units. Whilst polymer (B) may be an anionic or cationic polyacrylamide, it is preferably an anionic polyacrylamide. Polymer (B) may be partially hydrolysed acrylamide.

Said polymer (B) preferably includes a repeat unit which includes an optionally substituted acrylamide, for example an alkylacrylamide (e.g. methacrylamide) or N,N-dialkylacrylamide (e.g. N,N-dimethylacrylamide). Said optionally-substituted acrylamide may be of formula I

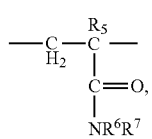

wherein $R^5$, $R^6$ and $R^7$ independently represent a hydrogen atom or an optionally-substituted (preferably unsubstituted) $C_{1-4}$ alkyl, preferably $C_{1-2}$ alkyl, more preferably a methyl group.

In formula I, $R^5$, $R^6$ and $R^7$ preferably represent hydrogen atoms.

On average, the ratio of the number of other repeat units in polymer (B) divided by the number of repeat units of formula I may be less than 0.6, 0.5, 0.4, 0.3 or 0.2. Said ratio may be at least 0.0025, at least 0.005, at least 0.05 or at least 0.1.

Said polymer (B) may include (e.g. in combination with repeat unit of formula I) a repeat unit which includes an acrylate or sulfonate moiety, for example an acrylate or sulfonate salt, or a pyrrolidone moiety. Polymers which include sulfonate salts may be preferred when the formulation is used with water which includes high levels of hardness ions, for example magnesium, calcium, strontium, barium or ferrous ions.

Said polymer (B) may include a repeat unit of formula I in combination with:

a repeat unit comprising a moiety of formula II

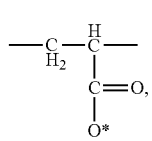

wherein the O* moiety is an O$^-$ moiety or is covalently bonded to another atom or group;

a repeat unit comprising a vinyl pyrrolidone moiety; or
a repeat unit comprising a moiety of formula III

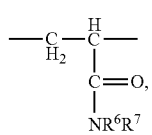

wherein $R^1$ and $R^2$ are independently selected from a hydrogen atom and an optionally-substituted alkyl group. An optionally-substituted alkyl group may define an electrically neutral hydrophobe. An optionally-substituted alkyl group may incorporate an —$SO_3R^3$ moiety wherein $R^3$ is selected from a hydrogen atom and a cationic moiety, for example an alkali metal cation, especially $Na^+$. Said optionally-substituted alkyl group may include 1 to 36, preferably 1 to 20, more preferably 1 to 10 carbon atoms. Said repeat unit may be derived from and/or based on AMPS.

Polymer (B) may be derived from one or more of the following monomers:

Cationic monomers—Methacryloyloxyethyltrimethylammonium chloride, Methacrylamidopropyltrimethylammonium chloride, Acryloyloxyethyltrimethylammonium chloride, Dimethyldiallylammonium chloride;

Anionic monomers—Sodium Acrylate, Sodium 2-Acrylamido-2-methylpropane sulfonate;

Non-ionic Monomers—Acrylamide, Methacrylamide, N,N Dimethylacrylamide, Vinyl pyrolidonone.

Polymer (B) may include monovalent (e.g. $NH_4^+$, $Li^+$, $Na^+$, $K^+$, $Rb^+$ or $Cs^+$), divalent (e.g. $Be^{2+}$, $Mg^{2+}$, $Ca^{2+}$, $Sr^{2+}$, $Ba^{2+}$, $Fe^{2+}$, $Cu^{2+}$ or $Zn^{2+}$) or trivalent (e.g. $Fe^{3+}$ or $Al^{3+}$) cations. It preferably includes monovalent cations, with $Na^+$ being preferred.

Said polymer (B) preferably includes acrylamide repeat units and acrylate, for example sodium acrylate, repeat units.

Said polymer (B) preferably includes acrylamide repeat units and AMPS derived repeat units.

Said polymer (B) preferably includes acrylamide repeat units and acrylate for example sodium acrylate, repeat units and AMPS derived repeat units.

Said polymer (B) may have a molecular weight of at least 200,000 Daltons, suitably at least 500,000 Daltons, preferably at least 1,000,000 Daltons. The molecular weight may be less than 50,000,000 Daltons or less than 30,000,000 Daltons. Molecular weight, described herein, may be measured by Measurement of Intrinsic Viscosity (see ISO 1628/1-1984-11-01); and using Intrinsic Viscosity/Molecular Weight Correlation via the Mark-Houwink Equation.

Said anionic surfactant (AS) may be selected from alkyl sulfates, olefin sulfonates, hydroxyalkane sulfonates, alkylether sulfonates, sulfosuccinates, alkyl benzene sulfonates, alkylnaphthalene sulfonates and sulfonated alkylated diphenyl ethers. Preferably, said anionic surfactant (AS) is selected from sulfosuccinates and sulfonated alkylated diphenyl ethers.

Said anionic surfactant (AS) is preferably an anionic sulphonate surfactant. Said surfactant may include carbon, hydrogen, oxygen and sulphur atoms only together with a metal cation, for example a group I cation. Said anionic surfactant (AS) may include an ether group. Said anionic surfactant (AS) may include a moiety of formula:

$$Z^1—O—Z^2$$

wherein $Z^1$ and $Z^2$ are, independently, optionally-substituted alkyl or aryl groups, for example phenyl, napthyl or anthracenyl groups. Preferably $Z^1$ and $Z^2$ are, independently, optionally-substituted alkyl or phenyl groups.

Groups $Z^1$ and $Z^2$ may independently include carbon and hydrogen atoms and one or more sulphonate group including an associated metal cation and no other types of atoms except those included in the moieties referred to.

Said groups $Z^1$ and $Z^2$ may include at least 3, preferably at least 6 carbon atoms. The sum of the number of carbon atoms in groups $Z^1$ and $Z^2$ may be in the range 2-100; 4-50; 8-45; 12-35; or 18-26.

At least one of the $Z^1$ and $Z^2$ may include a linear or branched alkyl group which may include 1-30; 2-25; 5-18; or 8-14 carbon atoms.

Suitability at least one of $Z^1$ and $Z^2$ includes a C4 to C15 (preferably a C6-C14, and more preferably a C8-C12) linear or branched alkyl group which is preferably unsubstituted. Preferably, only one of $Z^1$ and $Z^2$ includes said alkyl group.

Preferably, at least 50% or at least 80% of the molecules of said anionic surfactant (AS) are disulphonated. Preferably, 85 to 100% of the molecules of said surfactant are disulphonated.

Preferably $Z^1$ and $Z^2$ represent optionally-substituted phenyl groups and preferably said moiety of formula $Z^1$—O—$Z^2$ is of general formula

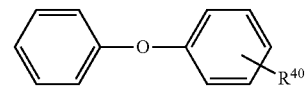

wherein at least one of the phenyl groups is sulphonated and, preferably, at least 80% of the molecules are disulphonated. Preferably, $R^{40}$ is a C4 to C15 (preferably a C6-C14, and more preferably a C8-C12) linear or branched alkyl group which is preferably unsubstituted.

A sulphonate group may be of formula —$SO_3M$, where M represents a hydrogen atom, an ammonium moiety or a metal atom, for example an alkali metal or alkaline earth metal atom; and, preferably, M is an alkali metal, especially sodium. Thus, a preferred sulphonate group is of formula —$SO_3Na$ and said moiety of formula $Z^1$—O—$Z^2$ is preferably of general formula.

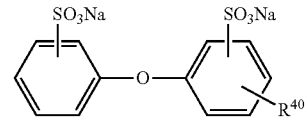

Surfactants of this formula are available under the tradename Dowfax® from Dow or Calfax® from Pilot Chemicals. It will be appreciated by a person skilled in the art that these surfactants may be a mixture of products comprising a major amount of a surfactant of this formula and minor amounts of monosulfonated monoalkylated, monosulfonated dialkylated or disulfonated dialkylated structures.

Said anionic surfactant (AS) may be an anionic surfactant as described in U.S. Pat. No. 8,304,377 or, preferably, is an anionic surfactant as described in U.S. Pat. No. 6,743,764.

Said anionic surfactant (AS) is preferably a C10 diphenyl oxide, such as a C10 diphenyl oxide disulfonate which may be sold under the trade mark Dowfax 3B2.

The total concentration of anionic surfactant (AS) in the fracturing fluid (YY) may be 1000 ppm or less; or 500 ppm or less. Preferably the total concentration of anionic surfactant (AS) in the fracturing fluid (YY) is at least 10 ppm.

The method may include contacting a second anionic surfactant (referred to as "surfactant 2AS") with said fracturing fluid (XX) or with a precursor of said fracturing fluid (XX).

Said surfactant (2AS) may be non-ionic, anionic, cationic or amphoteric. Said surfactant (2AS) is preferably an anionic surfactant which may be selected from aryl sulfonic acids for example naphthalene sulfonic acid, or salts thereof; or 1-30 alkyl aryl sulfonic acids or salts thereof, especially C1-30 alkyl naphthalene sulfonates, C1-30 alkyl benzene sulfonates, toluene sulfonic acid; and olefin sulfonates. Said surfactant (2AS) may be selected from toluene sulfonic acid or salts thereof; naphthalene sulfonic acids or salts thereof; sulfonates and olefin sulfonates. Surfactant (2AS) is preferably selected from toluene sulfonic acid or salts thereof; naphthalene sulfonic acids or salts thereof and alkylbenzene sulfonates. Alkylbenzene sulfonates are preferred. An alkyl benzene sulfonate may include an alkyl chain which is linear or branched and includes 1-30, suitably 5-20, preferably 8-16, more preferably 10-14 carbon atoms.

Said surfactant (2AS) is preferably an alkyl benzene sulphonate. It may be of general formula:

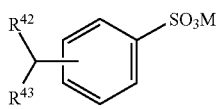

where $R^{42}CHR^{43}$ is a linear or branched alkyl group which is preferably unsubstituted. $R^{42}CHR^{43}$ may include 5 to 20, preferably 8 to 15, more preferably 9 to 13 carbon atoms. In one embodiment, $R^{42}CHR^{43}$ may have the formula $C_{12}H_{25}$. M may be H, an alkali metal, an alkaline earth metal or an ammonium moiety, for example derived from neutralizing an alkyl benzene sulfonic acid with a suitable amine or alkanolamine. Preferably, M is H, Na or an ammonium moiety derived from neutralizing said alkyl benzene sulfonic acid with an alkanolamine, especially monoethanolamine. Said surfactant (2AS) may be a dodecylbenzene sulphonate, especially the sodium or monoethanolamine salt of dodecylbenzene sulfonic acid.

Said fracturing fluid (YY) may include 10-5,000 ppm; 20-2,000 ppm, 50-1,000 ppm or 75-450 ppm of said anionic surfactant (AS). Said fracturing fluid (YY) may include 0.5 to 2.0, preferably 0.8 to 1.2 gpt (US gallons per thousand gallons) loading of said anionic surfactant (AS).

The ratio of the wt % of said anionic surfactant (AS) divided by the wt % of said surfactant (2AS) may be in the range 0.5 to 3.0, for example 0.9 to 2.5, preferably in the range 1.2 to 1.9.

The weight ratio of friction reducer formulation:said anionic surfactant (AS) may be in the range 1000:1 to 1:2, preferably 500:1 to 1:1, more preferably 100:1 to 5:1.

Anionic surfactant (AS) or the combination of anionic surfactant (AS) and surfactant (2AS) in the fracturing fluid (XX) may additionally act as a flowback aid and improve the recovery of treatment fluid and/or reservoir fluids, for example crude oil and connate water, after the fracturing operations have been completed (or paused).

Anionic surfactant (AS) may be provided by itself or as part of a booster formulation. Said booster formulation may comprise from 0.1 to 100 wt % of anionic surfactant (AS), for example 1 to 50 wt % and preferably 5 to 20 wt %.

Said booster formulation may comprise surfactant (2AS) in an amount from 0 to 99 wt %, for example 1 to 25 wt %, preferably from 5 to 10 wt %.

In one embodiment, said booster formulation comprises from 1-50 wt % of anionic surfactant (AS) and from 1 to 25 wt % of surfactant (2AS). Preferably, said booster formulation comprises from 5 to 20 wt % of anionic surfactant (AS) and from 5-10 wt % of surfactant (2AS). The ratio of the wt % of said anionic surfactant (AS) divided by the wt % of said surfactant (2AS) within said booster formulation may be in the range 0.9 to 2.5, preferably in the range 1.2 to 1.9.

Said booster formulation may comprise additional surfactants, solvents such as water, preservatives, formulation aids to improve the formulation stability, salts such as sodium, potassium, ammonium, magnesium and calcium salts and demulsifiers such as ethoxylate-propoxylate copolymers.

Said booster formulation may comprise water; it may comprise 0 to 99 wt % water, preferably 40 to 70 wt % water.

Said booster formulation may comprise a C1-20, preferably a C1-10 alkanol such as methanol, ethanol, propanol, isopropanol, butanol, 2-butanol, isobutanol, tert-butanol, amyl alcohol or hexanol. Preferably said booster formulation comprises methanol. Said booster formulation may comprise 0 to 99 wt % of said C1-20, preferably C1-10 alkanol. It preferably comprises 1 to 20 wt % and most preferably 5 to 15 wt % of said alkanol. Said booster formulation may comprise 5 to 15 wt % of methanol.

Said booster formulation may comprise an alkanolamine. Said alkanolamine may be a monoalkanolamine, a dialkanolamine or trialkanolamine, for example monoethanolamine, diethanolamine, triethanolamine, propanolamine, isopropanolamine, diisopropanolamine, diglycolamine, N-methyl diethanolamine, N-methyl ethanolamine, 4-amino-1-butanol. Said booster formulation may comprise 0 to 20 wt % of an alkanolamine, for example 0.01 to 10 wt %, preferably 0.1 to 5 wt %.

In the method of the first aspect, a fracturing fluid (YY) is preferably produced as described in a second aspect described hereinafter.

In a first embodiment, wherein said friction reducer formulation comprises a slurry, for example comprising powder provided in oil, said powder preferably comprises a polymer (C). At least 90 wt %, preferably at least 99 wt % of said powder preferably comprises said polymer (C), suitably excluding any water which may be associated with polymer (C).

Polymer (C) is preferably water-soluble; it is preferably substantially insoluble in the oil phase of said friction reducer formulation. It is preferably soluble in water, for example at a concentration of at least 10, 20 or 30 wt %.

Said water soluble polymer (C) preferably includes oxygen atoms; it is preferably capable of hydrogen bonding with water.

Said water soluble polymer (C) may include one or more moieties, suitably in a repeat unit, selected from —C(O)NH$_2$, —COO—, —O— and quaternary ammonium, for example alkyl quaternary ammonium, such as in —N$^+$(CH$_3$)$_3$ moieties. Moiety —C(O)NH$_2$ may be part of an acrylamide repeat unit. Moiety —COO— may be part of an acrylate (e.g. a salt of an acrylic acid) repeat unit. Moiety —O— may be part of an ether or a hydroxyl moiety.

In one embodiment, said polymer (C) is poly(ethylene oxide). It may have a weight average molecular weight between 100,000 and 20,000,000 Daltons, for example from 1,000,000 to 10,000,000 Daltons.

In a preferred embodiment, said polymer (C) includes an acrylamide repeat unit. It is preferably a polyacrylamide and, more preferably, is a partially hydrolysed polyacrylamide. Preferably, polymer (C) is an ionic polyacrylamide. Polymer (C) may include 0-50 mol %, preferably 5-40 mol %, more preferably 10-30 mol % of ionic repeat units. The balance suitably comprises non-ionic acrylamide repeat units. Whilst polymer (C) may be an anionic or cationic polyacrylamide, it is preferably an anionic polyacrylamide.

Said polymer (C) preferably includes a repeat unit which includes an acrylamide, for example of formula I described above.

On average, the ratio of the number of other repeat units in polymer (C) divided by the number of repeat units of formula I may be less than 0.6, 0.5, 0.4, 0.3 or 0.2. Said ratio may be at least 0.0025, at least 0.005, at least 0.05 or at least 0.1.

Said polymer (C) may include a repeat unit which includes an acrylate, sulfonate or pyrrolidone moiety, for example an acrylate or sulfonate salt. Polymers which include sulfonate salts may be preferred when the formulation is used with water which includes high levels of hardness ions, as described above.

Said polymer (C) may include a repeat unit of formula I as described above in combination with:
  a repeat unit comprising a moiety of formula II as described above; or
  a repeat unit comprising a vinylpyrrolidone moiety; or
  a repeat unit comprising a moiety of formula III as described above;
  wherein $R^1$ and $R^2$ are independently selected from a hydrogen atom and an optionally-substituted alkyl group. An optionally-substituted alkyl group may define an electrically neutral hydrophobe. An optionally-substituted alkyl group may incorporate an $-SO_3R^3$ moiety wherein $R^3$ is selected from a hydrogen atom and a cationic moiety, for example an alkali metal cation, especially $Na^+$. Said optionally-substituted alkyl group may include 1 to 36, preferably 1 to 20, more preferably 1 to 10 carbon atoms.

Polymer (C) may be derived from one or more of the following:
  Cationic monomers—Methacryloyloxyethyltrimethylammonium chloride, Methacrylamidopropyltrimethylammonium chloride, Acryloyloxyethyltrimethylammonium chloride, Dimethyldiallylammonium chloride;
  Anionic monomers—Sodium Acrylate, Sodium 2-Acrylamido-2-methylpropane sulfonate;
  Non-ionic Monomers-Acrylamide, Methacrylamide, N,N Dimethylacrylamide, Vinyl pyrolidonone.

Polymer (C) may include monovalent (e.g. $NH_4^+$, $Li^+$, $Na^+$, $K^+$, $Rb^+$ or $Cs^+$), divalent (e.g. $Be^{2+}$, $Mg^{2+}$, $Ca^{2+}$, $Sr^{2+}$, $Ba^{2+}$, $Fe^{2+}$, $Cu^{2+}$ or $Zn^{2+}$) or trivalent (e.g. $Fe^{3+}$ or $Al^{3+}$) cations. It preferably includes monovalent cations with $Na^+$ being preferred.

Said polymer (C) preferably includes acrylamide repeat units and acrylate, for example sodium acrylate, repeat units.

Said polymer (C) may have a molecular weight of at least 200,000 Daltons, suitably at least 500,000 Daltons, preferably at least 1,000,000 Daltons. The molecular weight may be less than 50,000,000 Daltons or less than 30,000,000 Daltons. Molecular weight may be measured as described above.

Examples of polymer (C) include solid (powderous) polyacrylamides including KemFlow A-5156, KemFlow A-5157, KemFlow A-5251, KemFlow A-5252. KemFlow A-5253, KemFlow A-5254, KemFlow A-5351, KemFlow A-5352, KemFlow A-5353, KemFlow A-5354, KemFlow A-5356 (Kemira, Atlanta, Ga., USA); Sedifloc 7030HM, Sedifloc 7030HHM (3F Chimica, Charlotte, N.C., USA).

In said first embodiment, said particles of said polymer (C) are preferably dispersed in said oil phase, suitably as solid discrete particles. The particles may be in the form of powder, granules or flakes. Unless otherwise stated, particles sizes are measured as hereinafter described. Said particles preferably have a mean particle diameter of at least 100 μm, at least 200 μm or at least 300 μm. Said mean particle diameter may be less than 1000 μm, for example less than 700 μm or less than 500 μm.

At least 90 wt %, preferably at least 98 wt %, more preferably about 100 wt % of said particles of said water soluble polymer (C) have a diameter greater than 1 μm, greater than 10 μm or greater than 20 μm. Said particles of said water soluble polymer (C) suitably have a diameter less than 2000 μm, or less than 1100 μm.

Said particles preferably include at least 85 wt %, preferably at least 95 wt % of said polymer (C). Said particles may include less than 15 wt %, preferably less than 5 wt % water.

In a second embodiment, wherein said friction reducer formulation comprises an inverse emulsion and/or a dewatered emulsion, said friction reducer formulation may comprises a fluid (D) comprising an oil phase and said polymer (B). Suitably, polymer (B) is dispersed in said oil phase to define said emulsion.

The friction reducer formulation may be for addition to an aqueous liquid, for example comprising water, to produce a fracturing fluid which can be used in fracturing a subterranean formation. Said aqueous liquid may be said precursor of said fracturing fluid (XX). The friction reducer formulation is suitably used to reduce the coefficient of friction of the aqueous liquid (e.g. said precursor of said fracturing fluid (XX) [or the fracturing fluid (XX) or the fracturing fluid (YY)]) during turbulent flow, for example during hydraulic fracturing of a subterranean formation. As a consequence, a pump used to inject fracturing fluid (YY) may be operated at a reduced speed and/or pressure; or for a given pump pressure, more pressure from the pump may be conveyed to the fracture face. The friction reducer formulation is suitably used to lower the friction or drag by suppressing the turbulence present in high velocity gradient water and, consequently, the water can be pumped at higher rates.

Said fluid (D) may comprise at least 15 wt %, preferably at least 25 wt %, of said oil phase. The fluid (D) may include less than 70 wt % or less than 50 wt % of said oil phase. Polymer (B) is suitably dispersed in the oil phase.

Said fluid (D) may comprise at least 15 wt %, preferably at least 25 wt % of polymer (B). It may include less than 50 wt % or less than 40 wt % of polymer (B). The aforementioned amount of polymer (B) is suitably on a dry matter basis.

Polymer (B) is suitably hydrated. For example polymer (B) may incorporate up to 70 wt %, 60 wt %, 50 wt % or 40 wt % water. Polymer (B) suitably includes at least 10 wt %, at least 14 wt % or at least 20 wt % water. In said fluid (D), polymer (B) is suitably a hydrated polymer which is dispersed within the oil phase. The hydrated polymer is suitably in the form of micron or sub-micron particles (e.g. 0.1-100 μm, preferably 0.5 to 10 μm). The inverse emulsion suitably includes a surface active agent to stabilise the emulsion.

Said fluid (D), for example in the form of an inverse emulsion may comprise at least 15 wt % water, preferably at least 20 wt % water. It may include less than 40 wt % water. The water may hydrate polymer (B).

In said second embodiment, preferably said fluid (D) is an emulsion which includes 15-40 wt % of said oil phase, 15-40 wt % of polymer (B) and 15-40 wt % of water. Said fluid (D) may include 1-10 wt % of surface active agent(s).

Fluid (D) may be selected from a wide range of emulsion type polyacrylamides including, for example, KemFlow A-4251, KemFlow A4355, KemFlow A-4356, KemFlow A-4358, KemFlow A-4361. KemFlow A-4366 (Kemira, Atlanta, Ga., USA); FLOJET DR-7000FLOJET DR-3046 (SNF, Riceboro, Ga., USA); Sedifloc 320A, and Sedifloc, 331A (3F Chimica, Charlotte, N.C., USA) containing anionic; and Alcomer-788 and Alcomer-889 (BASF, Florham Park, N.J., USA) as cationic polyacrylamide emulsions.

Said oil phase of said friction reducer formulation suitably comprises a hydrophobic liquid which is suitably inert. Said hydrophobic liquid may be a hydrocarbon. It may be selected from paraffinic hydrocarbons, napthenic hydrocarbons, aromatic hydrocarbons, benzene, xylene, toluene, mineral oils, diesel oil, biodiesel, kerosenes, naphthas (including hydrotreated naphtha), petrolatums, branch-chain isoparaffinic solvents, branch-chain hydrocarbons, saturated, linear, and/or branched paraffin hydrocarbons and combinations thereof. Said liquid may include a natural, modified or synthetic oil; or a vegetable oil such as canola oil, coconut oil, rapeseed oil and the like.

When said fluid (D), for example said inverse emulsion, is stabilised by a surface active agent, said surface active agent may have an HLB (hydrophilic-lipophilic balance) value between 2 and 10, in some cases between 3 and 9 and in other cases between 3 and 7.

As used herein, HLB is calculated using the art known method of calculating a value based on the chemical groups of the molecule. The method uses the following equation:

$$HLB = 7 + m*Hh + n*Hl$$

where m represents the number of hydrophilic groups in the molecule, Hh represents the value of the hydrophilic groups, n represents the number of lipophilic groups in the molecule and Hl represents the value of the lipophilic groups.

Non-limiting examples of suitable surface active agents include:
- fatty acid esters of mono-, di- and polyglycerols, for instance the monoleate, the dioleate, the monostearate, the distearate and the palmitostearate. These esters can be prepared, for example, by esterifying mono-, di- and polyglycerols, or mixtures of polyhydroxylated alcohols such as ethylene glycol, diethylene glycol, dipropylene glycol, 1,4-butanediol, 1,2,4-butanetriol, glycerol, trimethylolpropane, sorbitol, neopentyl glycol and pentaerythritol;
- fatty acid esters of sorbitan, for instance sorbitan monoleate, sorbitan dioleate, sorbitan trioleate, sorbitan monostearate and sorbitan tristearate;
- fatty acid esters of mannitol, for instance mannitol monolaurate or mannitol monopalmitate;
- fatty acid esters of pentaerythritol, for instance pentaerythritol monomyristate, pentaerythritol monopalmitate and pentaerythritol dipalmitate;
- fatty acid esters of polyethylene glycol sorbitan, more particularly the monooleates;
- fatty acid esters of polyethylene glycol mannitol, more particularly the monooleates and trioleates;
- fatty acid esters of glucose, for instance glucose monooleate and glucose monostearate;
- trimethylolpropane distearate;
- the products of reaction of isopropylamide with oleic acid;
- fatty acid esters of glycerol sorbitan;
- ethoxylated alkylamines;
- sodium hexadecyl phthalate;
- sodium decyl phthalate; and
- oil-soluble alkanolamides.
- surface active polymers such as ABA ethylene oxide-propylene oxide copolymer emulsifiers; and
- natural surfactants from plant or animal sources such as phospholipids.

Suitable active agents include those sold under the trade marks SPAN™ and TWEEN™.

The total amount of surface active agents in said fluid (D), for example said inverse emulsion, may be at least about 0.1 wt %, at least 0.5 wt %, or at least 1 wt %. The total may be 10 wt % or less than 5 wt % or less than 2.5 wt %.

In a third embodiment, said friction reducer formulation may comprise an inverse emulsion and/or a dewatered emulsion, wherein a powder is provided in the oil phase of said emulsion. In this case, said friction reducer formulation may comprises said fluid (D) comprising an oil phase and a polymer (C) in the form of particles (e.g. powder) which is dispersed and/or slurried in said oil phase, as described in the first aspect. Preferably, the fracturing fluid (YY) includes the friction reducer formulation according to the third embodiment and said booster formulation described. It preferably comprises the friction reducer formulation according to the third embodiment and said booster formulation comprising 1 to 50 wt % of anionic surfactant (AS), 1 to 25 wt % of surfactant (2AS), 1 to 20 wt % of an alkanol and 0.01 to 10 wt % of an alkanolamine.

In said friction reducer formulation, a ratio (X) defined as the parts by weight (hereinafter pbw) of said fluid (D) (e.g. said inverse emulsion) divided by the pbw of said particles is suitably in the range 1 to 12, preferably in the range 2 to 10, more preferably in the range 3 to 8.

In said friction reducer formulation, a ratio (Y) defined as the pbw of polymer (B) divided by the pbw of polymer (C) is suitably in the range 5:1 to 1:5, preferably 3:1 to 1:3, more preferably in the range 2:1 to 1:2.

In said friction reducer formulation, a ratio (Z) defined as the pbw of said oil phase divided by the pbw of polymer (C) is suitably in the range of 0.1 to 2, preferably in the range 0.1 to 1.2, more preferably in the range 0.3 to 1.0.

Said friction reducer formulation may include a suspending agent to facilitate suspension of said granules in the formulation. Said formulation may include less than 1 wt %, for example less than 0.75 wt % of suspending agent. It may include at least 0.1 wt % of suspending agent.

Said suspending agent may be organophilic. It is suitably insoluble in said fracturing fluid (XX). It is preferably a clay, for example an organophilic clay.

The organophilic clay, which associates with oily surfaces and rejects aqueous surfaces, may be the reaction product of purified smectite clay (such as hectorite, bentonite, attapulgite, sepiolite, montmorillonate, etc.) and a quaternary ammonium salt. It includes coated clay (or lignite) such as clay coated with a fatty-acid quaternary amine. The coating imparts dispersability of the clay in the oil. Exemplary organophilic clays include those disclosed in U.S. Patent Publication No. 20070197711 and U.S. Patent Publication No. 20100305008, herein incorporated by reference. Included here are organo bentonites such as BENTONER clays of Elementis Specialties, Inc. and Claytone SF, a product of Southern Clay Products. Further, such organophilic clays may be ion exchanged clays; see, for instance, U.S. Patent Publication No. 20010056149, herein incorporated by reference.

The fracturing fluid (XX) is preferably contacted with water, either before or after step (ii) of the method, to produce a fracturing fluid (YY). As a result of the contact and/or mixing with water, any inverse emulsion included may invert and the fracturing fluid so formed exhibits a lower friction in use compared to that of water alone.

Water which is used in the method and/or which forms the major part of fracturing fluid (YY) described herein may be derived from any convenient source. It may be potable water, surface water, sea water, brine, flow-back water, aquifer water or produced water. References herein to amounts of water, particularly in the context of water which forms a major part of a fracturing fluid described, suitably refer to water inclusive of components present in the source of water, such as dissolved salts found in sea water.

The water that forms a major part of the fracturing fluid may have a Total Dissolved Solids content of at least 2,000 ppm, at least 3,000 ppm, at least 5,000 ppm, at least 10,000 ppm, at least 50,000 ppm, at least 80,000 ppm, at least 100,000 ppm or at least 150,000 ppm.

A skilled person may select an appropriate anionic surfactant (AS) based on the amount of Total Dissolved Solids in the water. In one embodiment, wherein the water that forms the major part of fracturing fluid (YY) has a low level of Total Dissolved Solids, for example less than 80,000 ppm, less than 10,000 ppm, for example less than 3,000 ppm, it is preferred that anionic surfactant (AS) is a surfactant of the formula:

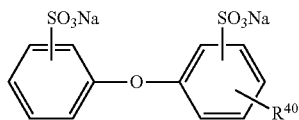

wherein $R^{40}$ is a C10-C16, preferably a C12-16, alkyl group.

In another embodiment, the water that forms the major part of the fracturing fluid may come from a source having a higher level of total dissolved solids. For example, said water may be a brine, or is flow-back water or produced water. Such water may have a Total Dissolved Solids content of at least 5,000 ppm, preferably at least 50,000, especially at least 80,000. In this case, it is preferred that anionic surfactant (AS) is a surfactant of the formula:

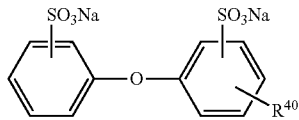

wherein $R^{40}$ includes less than 13 Carbon atoms—for example, it may be a C6-C12 (preferably unsubstituted) alkyl group, especially a C10-12 (preferably unsubstituted) alkyl group.

The method may comprise making a fracturing fluid (YY) which includes 25 to 5,000 ppm, 25 to 1000 ppm or 250 to 1000 ppm of fracturing fluid (XX) in an aqueous liquid, for example water.

In the method, other additives (in addition to anionic surfactant (AS)) may be included in fracturing fluid (YY). Said other additives may be selected from corrosion inhibitors, iron control additives such as citric acid or EDTA, chelating agents, acids, proppant particulates, acids, fluid loss control additives, biocides, and scale inhibitors, clay control additives, foamers, paraffin inhibitors, gelling agents, pH adjustment additives, buffers, cross-linkers, oxidizing agents, enzymes and gel degrading agents.

Preferably, at some stage in the method, one or a plurality of proppants is introduced thereby to define a component of said fracturing fluid (YY). The proppant may have a size of at least 140 US Mesh; it may have a size of less than 5 US Mesh. The proppant may be selected from sand, bauxite, and man-made intermediate or high strength materials. The proppant is arranged to restrict close down of a fracture on removal of hydraulic pressure which caused the fracture.

Preferably, at some stage in the method, said fracturing fluid (YY) includes 2.9 to 54 wt %, for example 5 to 40 wt %, of proppants.

According to a second aspect of the invention, there is provided a fracturing fluid (YY) (e.g. a slick water fracturing fluid), said fracturing fluid comprising:
fracturing fluid (XX);
anionic surfactant (AS); and
water.

Said fracturing fluid (XX) may be as described in the first aspect. Said anionic surfactant (AS) may be as described in the first aspect. Said fracturing fluid (YY) may be as described in the first aspect.

Said fracturing fluid (YY) may include a second anionic surfactant (referred to as "surfactant 2AS") as described in the first aspect.

Said fracturing fluid (YY) may include proppant as described in the first aspect.

Said fracturing fluid (YY) (disregarding any and all proppant that may be included in the fluid) may include at least 99 wt % water.

In a first preferred embodiment of the second aspect, fracturing fluid (XX) may comprise a said friction reducer formulation as described in the third embodiment of the first aspect, wherein said friction reducer formulation comprises an inverse emulsion and/or a dewatered emulsion, wherein a powder is provided in the oil phase of said emulsion.

In a second preferred embodiment of the second aspect, fracturing fluid (XX) may incorporate water having a Total Dissolved Solids of greater than 10000 ppm and anionic surfactant (AS) is of the formula:

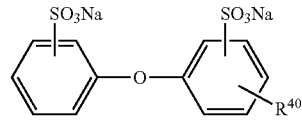

wherein $R^{40}$ is an alkyl group, especially a C10-12 (preferably unsubstituted) alkyl group.

In a third preferred embodiment of the second aspect, fracturing fluid (XX) may incorporate water having a Total Dissolved Solids of less than 84000 ppm and anionic surfactant (AS) is of the formula:

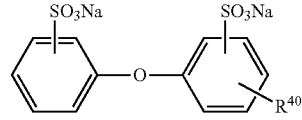

wherein $R^{40}$ is an alkyl group, especially a C14-16 (preferably unsubstituted) alkyl group.

According to a third aspect of the invention, there is provided a formulation comprising anionic surfactant (AS) and surfactant (2AS), each being as described in the first aspect. Said formulation may be said booster formulation described in the first aspect.

The formulation may include a water-soluble polymer (B) as described in the first aspect. The formulation may include an oil phase as described in the first aspect.

According to a fourth aspect of the invention, there is provided a method of fracturing a subterranean formation, the method comprising contacting the formation with a fracturing fluid (YY) made in a method of the first aspect and/or as described in the second aspect and/or including a formulation as described in the third aspect.

Said method preferably comprises fracturing a subterranean formation penetrated by a well by pumping into the well the fracturing fluid (YY) at a pressure sufficient to create and/or extend a fracture network.

According to a fifth aspect of the invention, there is provided the use of an anionic surfactant (AS) and/or a booster formulation as described in improving the performance of a fracturing fluid (XX) and/or a friction reducer formulation as described.

According to a sixth aspect of the invention, there is provided an assembly positioned adjacent a subterranean formation and arranged to deliver a fracturing fluid (YY) as described in the first aspect into the formation, said assembly comprising:
(I) a receptacle containing a friction reducer formulation according to the first aspect;
(II) a receptacle containing anionic surfactant (AS), for example said booster formulation, according to the first aspect;
(III) an aqueous liquid which may be a precursor of a fracturing fluid (XX) as described in the first aspect;
(IV) a pump (PI) for dosing said friction reducer formulation from said receptacle, suitably to define at least part of a fracturing fluid (YY);
(V) a pump (P2) for dosing anionic surfactant (AS), for example said booster formulation, from said receptacle, suitably to define at least part of fracturing fluid (YY);
(VI) a conduit for delivering fracturing fluid (YY) into the formation; and
(VII) a pump (P3) for injecting the fracturing fluid (YY) via said conduit into the formation.

Any feature or any aspect of any invention or embodiment described herein may be combined with any feature of any aspect of any other invention or embodiment described herein mutatis mutandis.

SPECIFIC EMBODIMENTS OF THE INVENTION

Figure 2:
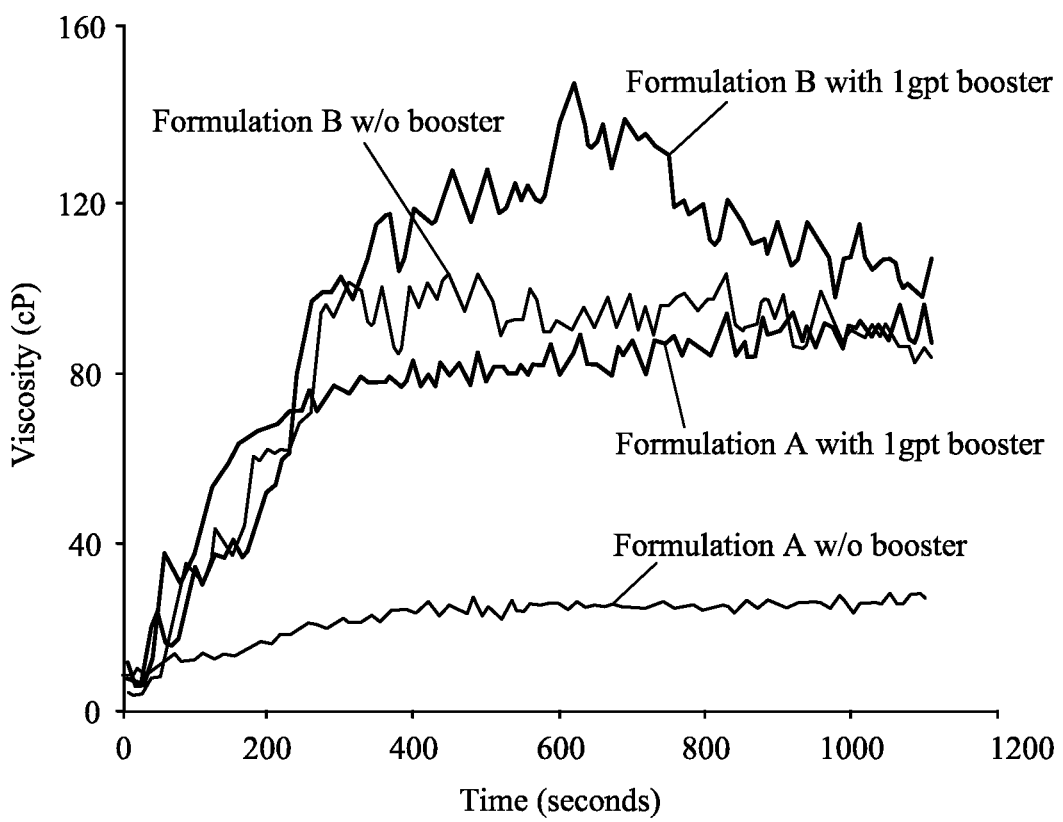
FIG. 2 is viscosity data collected on a Grace 3600 viscometer at 20° C. using 1 gpt polymer and booster (combination of Dodecylbenzene sulfonate, MEA Salt and DPDS).

Specific embodiments of the invention will now be described, by way of example, with reference to the accompanying figures, in which:

FIGS. 1 and 2 are graphs of viscosity v. time for specified mixtures; and FIGS. 3 to 7 are graphs of friction reduction v. time for specified mixtures.

The following materials are referred to hereinafter:

Emulsion polymer (EP)—commercially available emulsion friction reducer composition supplied as HiRate 605 available from Independence Oilfield Specialties and comprising approximately 20 wt % of an anionic partially hydrolysed polyacrylamide copolymer, present as an inverse emulsion with water and surfactant in approximately 25 wt % of a continuous oil phase comprising a hydro treated light petroleum distillate.

Organophilic Clay (OC)—Claytone SF from BYK.

Granule polyacrylamide (GP)—commercially available particulate friction reducer composition comprising >90% of an anionic partially hydrolysed polyacrylamide copolymer. The material has a volume median particle diameter of 320.8 µm, a volume mean particle diameter of 323.2 µm, the largest particles being 948 µm and the smallest being 27.4 µm. Analysis was performed using a Beckman Coulter Laser Particle Size Analyser LS13320.

DPDS—refers to a Benzenesulfonic acid, decyl(sulfophenoxy)-, disodium salt sold as Dowfax 3B2 (Trade Mark).

TPDPDS refers to a Benzene, 1,1'-oxybis-, tetrapropylene derivatives, sulfonated, Sodium salt.

HDPDS—refers to a Benzenesulfonic acid, hexadecyl (sulfophenoxy)-, disodium salt.

DDPDS—refers to 1,1'-oxybisbenzene Tetrapropylene Derivs., Sulfonated, Sodium Salt.

LAS, MEA Salt—refers to Dodecylbenzene sulfonate, MEA Salt.

TMAC—refers to Trimethylammonium Chloride.

Disodium Amino Carboxylate—refers to Disodium cocoamphodipropionate.

Example 1—Preparation of Water Soluble Polymer Formulations for Testing

There are 4 emulsion/polymer types used for screening of the performance booster formulation; emulsion polymer (EP), EP with granular polyacrylamide (GP), slurry suspension and dry polyacrylamide. The following formulations, B thru D, were prepared by blending the components described in Table 1. The blending procedure uses an overhead stirrer, mixing blade and beaker.

The first formulation, B, is mixed in general terms, with mixing at medium speed (500 rpm-1000 rpm), the oil is added first followed by the surfactant system. Emulsion Polymer (EP) is then added to the oil mixture. Next clay is added and stirring is continued to disperse and activate the clay. The Granule Polyacrylamide (GP) is added and stirred until formulation is uniform with no clumps. Finally, if applicable, the stabilization system is added and mixed until uniform. Mixture stored under ambient conditions in a dry, sealed container.

The final two formulations, C and D, are mixed with mixing speeds at 550 rpm. The oil is added to the beaker followed by the clay which is allowed to fully disperse and activate. The surfactant system is added next and mixed for 10 minutes. The GP is added and mixed until a smooth uniform slurry is formed with no clumps. The formulation is stored under ambient conditions in a dry, sealed container until needed.

TABLE 1

POLYMER FORMULATIONS

| Formulation Identifier | Emulsion Polymer (wt %) | Organophilic Clay (wt %) | Granule Polyacrylamide (wt %) | Surfactant System (wt %) | Mineral Oil (wt %) |
|---|---|---|---|---|---|
| A | 100.00 | 0.00 | 0.00 | 0.00 | 0.00 |
| B | 68.80 | 0.70 | 20.00 | 4.50 | 6.00 |
| C | 0.00 | 2.25 | 50.00 | 0.42 | 47.33 |
| D | 0.00 | 0.00 | 100.00 | 0.00 | 0.00 |

Example 2—General Procedure for Preparing Water Brines

Three synthetic brines were mixed and used for range testing of the performance booster formulation. Tables 2 & 3 show the divalent mixtures used for each brine. A mixing vessel, such as a volumetric flask or a 5-gallon bucket, is filled about two-thirds full with DI water to start. Depending on the size of the mixing vessel a magnetic stir bar and stir plate or an overhead mixer is used to create a vortex for adequate mixing of the salts. The salts are weighed out on a percent weight per final volume basis and added to the side wall of the vortex to ensure complete dissolution. Once all salts are added to the water, complete by adding the final third of water to the vessel and mix thoroughly.

TABLE 2

WATER QUALITY-2475 TDS

| Ion | Ion Concentration (ppm) |
|---|---|
| $Na^+$ (a) | 331 |
| $Sr^{2+}$ (b) | 10 |
| $K^+$ (c) | 23 |
| $Mg^{2+}$ (d) | 186 |
| $Ca^{2+}$ (e) | 300 |
| $Cl^-$ | 879 |
| $SO_4^-$ (f) | 608 |
| $HCO_3^-$ (g) | 201 |

(a) In the form of NaCl
(b) In the form of $SrCl_2 \cdot 2H_2O$
(c) In the form of KCl
(d) In the form of $MgCl_2 \cdot 6H_2O$
(e) In the form of $CaCl_2 \cdot 2H_2O$
(f) In the form of $Na_2SO_4$
(g) In the form of $NaHCO_3$

TABLE 3

Water Quality-84K TDS
B mbn

| Ion | Ion Concentration (ppm) |
|---|---|
| $Na^+$ (a) | 30,000 |
| $Ca^{2+}$ (b) | 3,000 |
| $Cl^-$ | 51,573 |

(a) In the form of NaCl
(b) In the form of $CaCl_2 \cdot 2H_2O$

TABLE 4

WATER QUALITY-150K TDS

| Ion | Ion Concentration (ppm) |
|---|---|
| $Na^+$ (a) | 57,500 |
| $K^+$ (b) | 70 |
| $Ca^{2+}$ (c) | 1,888 |
| $Mg^{2+}$ (d) | 187 |
| $Ba^{2+}$ (e) | 16 |
| $Sr^{2+}$ (f) | 244 |
| $Cl^-$ | 92,830 |
| $HCO_3^-$ (g) | 573 |
| $SO_4^-$ (h) | 75 |

(a) In the form of NaCl
(b) In the form of KCl
(c) In the form of $CaCl_2 \cdot 2H_2O$
(d) In the form of $MgCl_2 \cdot 2H_2O$
(e) In the form of $BaCl_2 \cdot 2H_2O$
(f) In the form of $SrCl_2 \cdot 6H_2O$
(g) In the form of $NaHCO_3$
(h) In the form of $Na_2SO_4$ Example 3—General Procedure for Vortex Inhibition Testing for Water Soluble Polymer Formulations A vortex inhibition test is used to measure vortex closure times for water soluble polymer systems when introduced to water via vortex agitation. The speed of closure is an indication of how much polymer dissolves. Faster closure is generally viewed as better. The closure times in Tables 5-9 were determined by placing 100 ml of water in a 250 ml glass beaker with a magnetic stir rod. The beaker is then set on a stir plate to use as the agitator to create a vortex with the following dimensions: 1 inch radius and 0.5 inch height. Using a syringe, the side wall of the vortex is rapidly dosed with the water soluble polymer formulation and a performance booster, unless otherwise noted, and timed for total vortex closure-when the vortex no longer shows a dip on the surface of the fluid.

Example 4—Vortex Inhibition Testing in Various Water Qualities

Various surfactants were tested as described in Example 3 with different TDS waters and the results are provided below:

TABLE 5

CLOSURE TIMES 2475 TDS WATER-FORMULATION B @ 2.0% w/v

| Performance Booster | Performance Booster Dosage (ppm) | Closure Time (sec) |
|---|---|---|
| Control | 0 | 68 |
| DPDS | 217 | 61 |
| TPDPDS | 217 | 46 |
| HDPDS | 217 | 44 |
| DDPDS | 217 | 43 |
| Sodium Di(2-ethylhexyl) Sulfosuccinate | 217 | 56 |

TABLE 6

CLOSURE TIMES 84K TDS WATER-FORMULATION B @ 2.0% w/v

| Performance Booster | Performance Booster (ppm) | Closure Time (sec) |
|---|---|---|
| Control | 0 | 135 |
| DPDS | 217 | 55 |
| LAS, MEA Salt | 217 | 137 |
| TPDPDS | 217 | 81 |
| TMAC (Comparative example) | 217 | 118 |
| Disodium Amino Carboxylate | 217 | 116 |
| Sodium Di(2-ethylhexyl) sulfosuccinate | 217 | 121 |

TABLE 7

CLOSURE TIMES 150K TDS WATER-FORMULATION B @ 2.0% w/v

| Performance Booster | Performance Booster (ppm) | Closure Time (sec) |
|---|---|---|
| Control | 0 | 149 |
| DPDS | 217 | 68 |

The control formula B without booster shows a vortex closure time of 68 seconds in 2475 TDS brine which increases to 135 seconds in 84K TDS brine and then 149 seconds in 150K TDS brine. This indicates the ions in the water, particularly divalent ions such as calcium are slowing the dissolution of the polymer. Adding in selected surfactants described can speed up closure time indicating the polymer is dissolving quicker in all three waters.

Example 5—Vortex Inhibition Testing Across Multiple Surfactants

DPDS was compared to various surfactants by testing as described in Example 3 and the results are provided below:

TABLE 8

CLOSURE TIMES IN 84K TDS WATER-
FORMULATION B @ 2% w/v

| Performance Booster Type | Booster Dosage(ppm) | Closure Time(sec) |
|---|---|---|
| — | 0 | 135 |
| DPDS | 150 | 56 |
| DPDS | 1000 | 59 |
| Linear Alcohol Ethoxylate(c) | 150 | 131 |
| Linear Alcohol Ethoxylate(c) | 1000 | 99 |
| Nonylphenol Ethoxylate(d) | 150 | 139 |
| Nonylphenol Ethoxylate(d) | 1000 | 53 |
| Alkyl Ether Sulfate(e) | 150 | 139 |
| Alkyl Ether Sulfate(e) | 1000 | 99 |
| DIPSA(f) | 150 | 105 |
| DIPSA(f) | 1000 | 53 |
| Branched Alcohol Ethoxylate(g) | 150 | 106 |
| Branched Alcohol Ethoxylate(g) | 1000 | 70 |
| Ethoxylated Diol(h) | 150 | 143 |
| Ethoxylated Diol(h) | 1000 | 77 |
| Siloxane(i) | 150 | 130 |
| Siloxane(i) | 1000 | 97 |
| Alpha Olefin Sulfonate(j) | 150 | 138 |
| Alpha Olefin Sulfonate(j) | 1000 | 82 |
| SDS(k) | 150 | 161 |
| SDS(k) | 1000 | 125 |

(c)Alcohols, C12-15, ethoxylated
(d)2-[[ ]4-(2,4,4-trimethylpentan-2-yl)phenoxy]ethanol
(e)Alpha-sulfo-omega-hydroxypoly(oxy-1,2-ethanidiyl)C10-16 Alkyl Ethers, Sodium Salts
(f)Napthalenesulfonic acid, bis(1-methylethyl)-, me derives
(g)Alcohols, C12-C14-secondary, ethoxylated
(h)2,5,8,11-Tetramethyl-6-dodecyn-5,8-diol ethoxylate
(i)Oxirane, 2-methyl-, polymer with oxirane, mono(3-(1,3,3,3-tetramethyl-1-((trimethylsilyl)oxy)-1disiloxanyl)propyl)
(j)Sulfonic Acids, C14-16-alkane Hydroxy and C14-16-alkene, Sodium Salts
(k)Sodium Decyl Sulfate Table 8 shows vortex inhibition testing using surfactant DPDS and known boosters. As can be seen in the table some surfactants perform effectively while others do not or they need much higher concentrations to perform (1000 ppm).

Example 6—Vortex Inhibition Testing Across Different Water Soluble Polymer Formulations Using DPDS as Booster DPDS was tested with the alternative polymer formulations described in Table 1 and the results are provided below:

TABLE 9

CLOSURE TIME 84K TDS WATER-DPDS

| Formulation Identifier from Table 1 | Polymer Loading(ppt) | Performance Booster (ppm) | Closure Time(sec) |
|---|---|---|---|
| A | 11 | 0 | >360 |
| A | 11 | 217 | 52 |
| B | 11 | 0 | 135 |
| B | 11 | 217 | 55 |
| C | 11 | 0 | 41* |
| C | 11 | 217 | 32* |
| D | 11 | 0 | 131 |
| D | 11 | 217 | 89 |

*Performed in 2K TDS synthetic brine found in Table 2

Table 9 shows significant reduction in closure times over the control when using polymer emulsion (formulation A), polymer emulsion combined with polymer particles (formulation B), polymer slurry (formulation C) and powder only (formulation D) when used in conjunction with the surfactant DPDS.

Example 7—General Procedure for Flow-Loop Testing of Formulations

A flow loop device is used to examine friction reduction as a function of time. Not having maximal friction reduction and/or rapid dissolution times can mean a loss in polymer performance that could impact the cost and time of a hydraulic fracturing operation. Low polymer performance can also impact oil well production if proppant carrying and placement in the formation is impacted. The flow loop used was composed of two 10 ft pipes in sequence, one ¾ inch and the other ½ inch. The water used came from tap water and was held in a 5 gallon reservoir tank, equipped with an overhead stirrer. The fluid was recirculated through the pipes and reservoir using a Moyno 5 pump. The flow rate in each test was held constant at 10 gal/min. Initially, Test water was pumped for two minutes at constant rate to establish a baseline. After two minutes, a friction reducer to be tested was added to the reservoir tank with 30 seconds of vigorous mixing to assure uniform distribution of friction reducer while also flowing through the flow loop plumbing. The pressure drop across the length of each pipe, the flow rate through each pipe and the fluid temperature was continuously recorded, with data being collected at a rate of one data point per second. At the completion of each test, the flow rate, temperature and the percent friction reduction (calculated as $1-(\Delta P\ FR/\Delta P\ water)$), were plotted against time.

Example 8—Flow Loop Performance of Formulation B with Performance Boosters

Using the procedure of Example 6, flow-loop testing was undertaken. As can be seen in Table 10 and FIG. 3, the control using just the polymer formulation without the use of any performance booster (formula B) had an inversion time of 48 seconds and the max % friction reduction was 59.9% in 84K water.

TABLE 10

FRICTION REDUCTION 84K TDS WATER-
FORMULATION B @ 0.1 GPT

| Performance Booster(ppm) | Time to 95% Friction Reduction(sec) | Maximum % Friction Reduction |
|---|---|---|
| 0 | 48 | 59.9 |

Referring to Tables 11 to 13, it will be noted that, in 2K TDS water, DPDS shows improvements in max % friction reduction as well as an faster dissolution of the polymer in water. In 84K and 150K TDS water, DPDS performs well with significant improvements in max % friction reduction and faster dissolution of the polymer. In table 12 phenol was tried as a booster and the data does not show a significant benefit that is counter to U.S. Pat. No. 5,124,376 which shows an inversion benefit for the latex emulsions used.

TABLE 11

FRICTION REDUCTION 2K TDS WATER-FORMULATION B @ 0.1 GPT

| Performance Booster | Performance Booster Dosage (ppm) | Time to 95% Friction Reduction (sec) | Maximum % Friction Reduction |
|---|---|---|---|
| — | — | 47 | 68.8 |
| DPDS | 217 | 26 | 75.0 |

TABLE 12

FRICTION REDUCTION 84K TDS WATER-FORMULATION B @ 0.1 GPT

| Performance Booster | Performance Booster Dosage(ppm) | Time to 95% Friction Reduction(sec) | Maximum % Friction Reduction |
|---|---|---|---|
| Linear Alcohol Ethoxylate[a] (Comparative) | 150 | 47 | 69.72 |
| | 1000 | 35 | 70.79 |
| DPDS | 150 | 28 | 70.21 |
| HDPDS | 150 | 44 | 63.18 |
| Phenol | 217 | 64 | 57.9 |

[a]Alcohols, C12-15, ethoxylated

TABLE 13

FRICTION REDUCTION 150K-FORMULATION B @ 0.1 GPT

| Performance Booster | Performance Booster Dosage (ppm) | Time to 95% Friction Reduction (sec) | Maximum % Friction Reduction |
|---|---|---|---|
| — | — | 68 | 57.5 |
| DPDS | 217 | 34 | 68.6 |

Example 9—Viscosity Increase Using Booster Comprising Dodecylbenzene Sulfonate, MEA Salt and DPDS)

FIG. 1 viscosity data was collected on a Grace 3600 viscometer at 511 s$^{-1}$ at 20° C. in 84K TDS water using 1 gpt polymer and booster (combination of Dodecylbenzene sulfonate, MEA Salt and DPDS). As can be seen in the graph, the booster aided the polymer in building viscosity. This can be a desired property in that proppant can be more effectively carried and placed in the formation during hydraulic fracturing.

Example 10—Viscosity Increase Using Booster

FIG. 2 viscosity data was collected on a Grace 3600 viscometer at 20° C. using 1 gpt polymer and booster (combination of Dodecylbenzene sulfonate, MEA Salt and DPDS). As can be seen in the graph, the booster aided formulation A and B in building viscosity. This can be a desired property in that proppant can be more effectively carried and placed in the formation during hydraulic fracturing.

Example 11—Flow Loop Data on Formulation B

Figure 3:
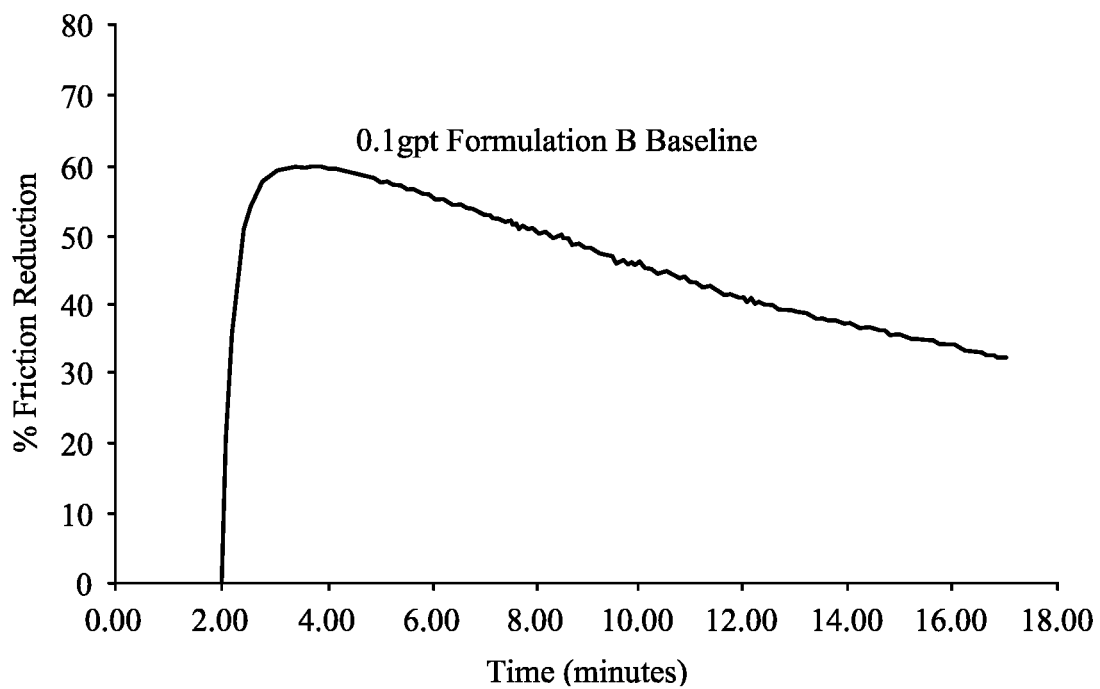
FIG. 3 is baseline flow loop data for formulation B in 84K TDS brine.

FIG. 3 is baseline flow loop data for formulation B in 84K TDS brine.

Example 12—Flow Loop Data on Formulation B with DPDS

Figure 4:
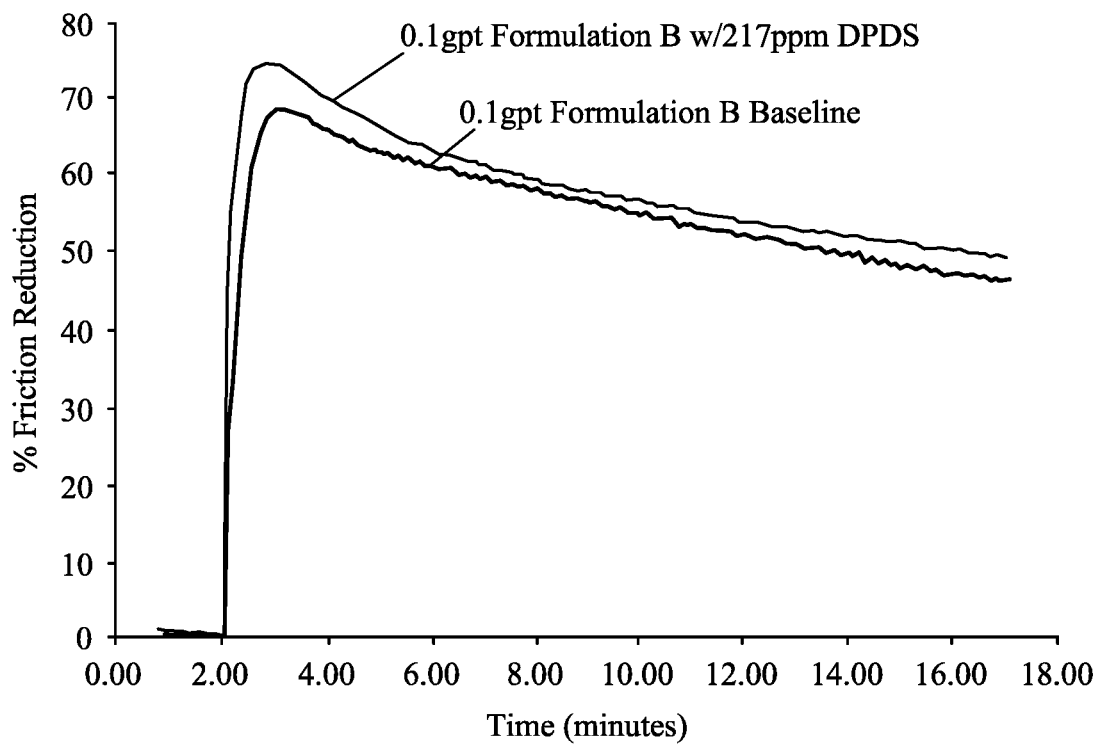
FIG. 4 includes flow loop data on Formulation B with DPDS which shows DPDS provides a friction reduction benefit and faster dissolution of the polymer in 2K TDS brine.

FIG. 4 includes flow loop data on Formulation B with DPDS which shows DPDS provides a friction reduction benefit and faster dissolution of the polymer in 2K TDS brine.

Example 13—Flow Loop Data on Formulation B with Various Surfactants

Figure 5:
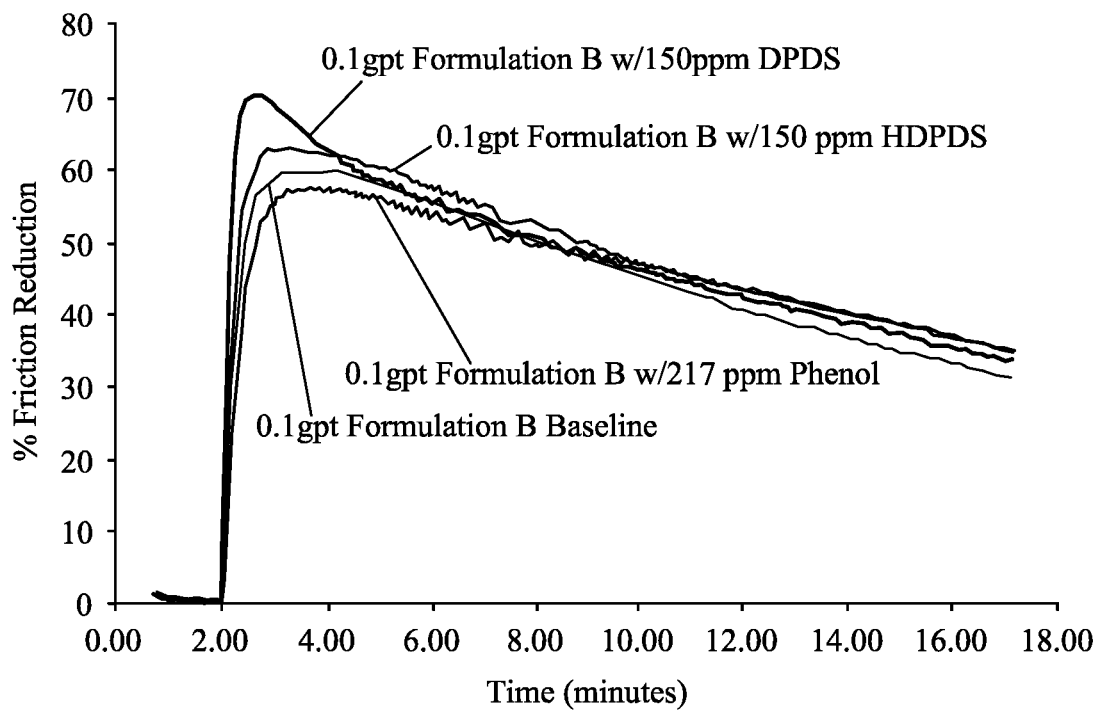
FIG. 5 includes flow loop data on formulation B with various surfactants which shows DPDS provides better friction reduction and/or faster dissolution of the polymer vs. other known boosters such as phenol.

FIG. 5 includes flow loop data on formulation B with various surfactants which shows DPDS provides better friction reduction and/or faster dissolution of the polymer vs. other known boosters such as phenol.

Example 14—Flow Loop Data on Formulation B with DPDS in 150K TDS Brine

Figure 6:
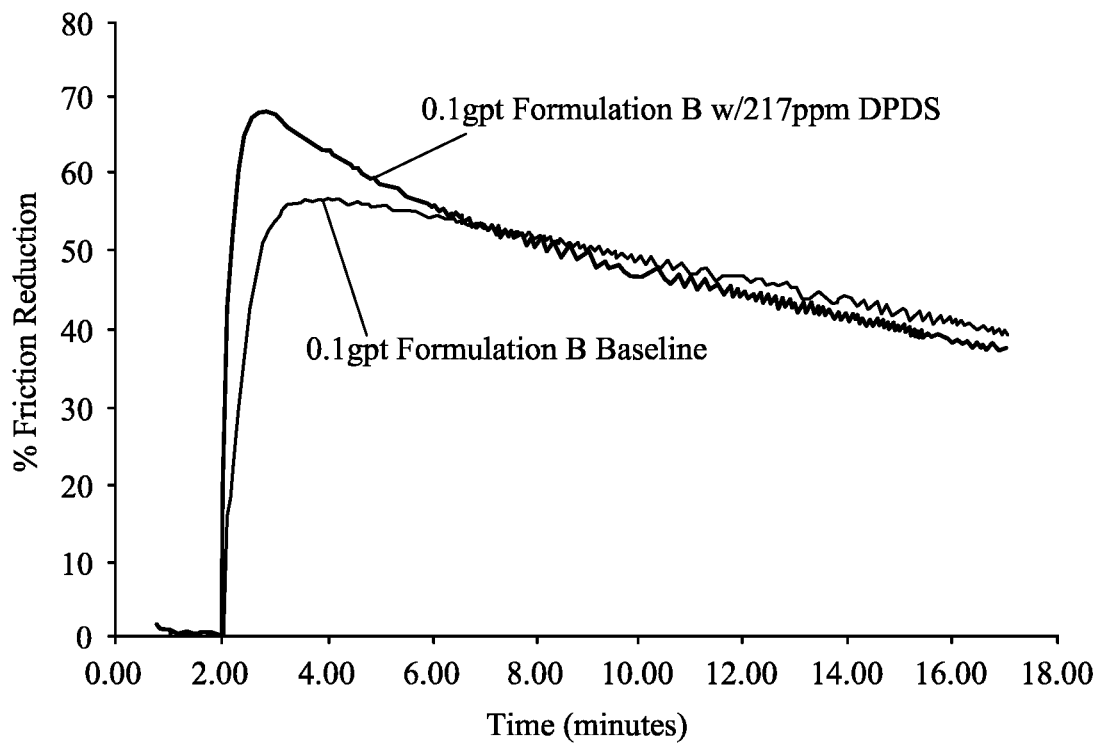
FIG. 6 includes flow loop data on formulation B with DPDS which is found to provide a friction reduction benefit and allow faster dissolution of the polymer in 150K TDS brine.

FIG. 6 includes flow loop data on formulation B with DPDS which is found to provide a friction reduction benefit and allow faster dissolution of the polymer in 150K TDS brine.

Example 15—Flow Loop Data on Formulation a with DPDS in Tap Water

Figure 7:
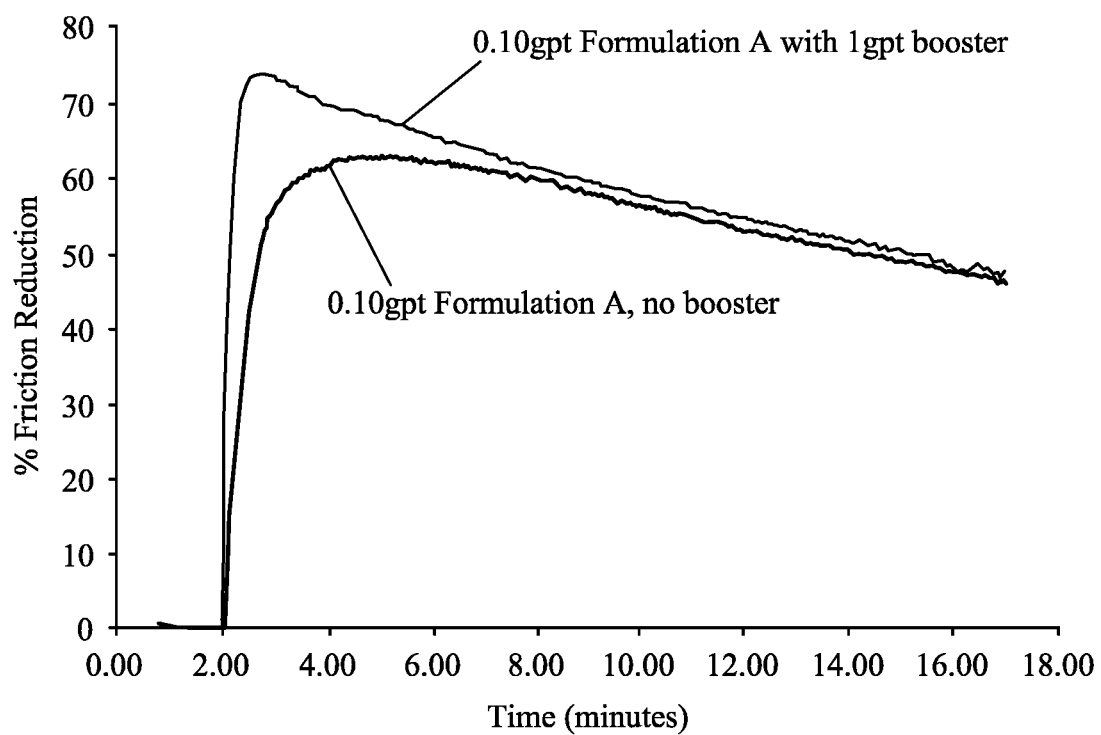
FIG. 7 show a booster combination of dodecylbenzene sulfonate, MEA Salt and DPDS which provides a friction reduction benefit and faster dissolution of the polymer in tap water using formulation A.

FIG. 7 show a booster combination of dodecylbenzene sulfonate, MEA Salt and DPDS which provides a friction reduction benefit and faster dissolution of the polymer in tap water using formulation A.

Thus, the data above shows that DPDS and other related surfactants, optionally in combination with dodecylbenzene sulfonate, MEA Salt can be used in a range of friction reducer formulations to provide significant benefits as described.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:
1. A method of preparing a fracturing fluid (YY), the method comprising:
(i) selecting a booster formulation comprising an anionic surfactant (AS) and water;
(ii) contacting the booster formulation comprising said anionic surfactant (AS) and water with a fracturing fluid (XX);
wherein the fracturing fluid (XX) incorporates a friction reducer formulation;
wherein said friction reducer formulation comprises a water-soluble polymer (B) in combination with an oil phase, wherein polymer (B) is dispersed in said oil phase and comprises 0.1 to 100 μm particles of said polymer (B):

wherein said friction reducer formulation further comprises a slurry and said slurry comprises a polymer (C) wherein particles of polymer (C) are dispersed in said oil phase as solid discrete particles and said particles have a mean particle diameter of at least 100 μm and less than 1000 μm, wherein said polymer (C) includes an acrylamide repeat unit; and wherein said anionic surfactant (AS) is an anionic sulphonate surfactant.

2. The method according to claim 1, wherein said friction reducer formulation comprises a combination of an emulsion and a powder slurried in a fluid.

3. The method according to claim 1, wherein said water-soluble polymer (B) includes optionally-substituted acrylamide repeat units and, optionally, acrylate repeat units.

4. The method according to claim 1, wherein said polymer (B) includes an optionally-substituted acrylamide repeat unit; and acrylate and/or 2-acrylamido-2-methylpropane sulfonate (AMPS)-based repeat units.

5. The method according to claim 1, wherein said anionic surfactant (AS) includes a moiety of formula:

wherein $Z^1$ and $Z^2$ are, independently, optionally-substituted alkyl or aryl.

6. The method according to claim 5, wherein groups $Z^1$ and $Z^2$ include at least at least 3 carbon atoms; and/or the sum of the number of carbon atoms in groups $Z^1$ and $Z^2$ is in the range 2-100, and/or at least one of $Z^1$ and $Z^2$ includes a C4 to C15 linear or branched alkyl group.

7. The method according to claim 5, wherein only one of $Z^1$ and $Z^2$ includes an alkyl group.

8. The method according to claim 5, wherein 85 to 100% of molecules of said surfactant are disulphonated.

9. The method according to claim 5, wherein said moiety of formula $Z^1$—O—$Z^2$ is of general formula

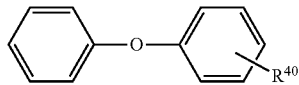

wherein at least one of the phenyl groups is sulphonated and $R^{40}$ is a C4 to C15 linear or branched alkyl group which is unsubstituted.

10. The method according to claim 1, further comprising contacting said fracturing fluid (XX) or a precursor of said fracturing fluid (XX) with a second anionic surfactant.

11. The method according to claim 10, wherein said the second anionic surfactant comprises alkyl benzene sulphonate of general formula:

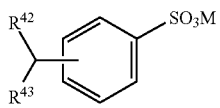

where $R^{42}CHR^{43}$ is a linear or branched alkyl group; M is H, Na or an ammonium moiety derived from neutralizing said alkyl benzene sulfonic acid with an alkanolamine.

12. The method according to claim 10, wherein the anionic surfactant (AS) is provided as part of a booster formulation, wherein said booster formulation comprises 1 to 50 wt % of the anionic surfactant (AS) and 1 to 25 wt % of the second anionic surfactant.

13. The method according to claim 12, wherein said booster formulation comprises from 5 to 20 wt % of anionic surfactant (AS) and from 5-10 wt % of the second anionic surfactant; and/or the ratio of the wt % of said anionic surfactant (AS) divided by the wt % of said the second anionic surfactant within said booster formulation is in the range 0.9 to 2.5.

14. The method according to claim 1, wherein polymer (C) is poly(ethylene oxide) or includes a repeat unit which includes an acrylamide.

15. The method according to claim 1, wherein said friction reducer formulation comprises an inverse emulsion and/or a dewatered emulsion, wherein said friction reducer formulation comprises a fluid (D) comprising the oil phase and polymer (B) dispersed in said oil phase to define said emulsion.

16. The method according to claim 15, wherein said fluid (D) is an emulsion which includes 15-40 wt % of said oil phase, 15-40 wt % of polymer (B) and 15-40 wt % of water.

17. The method according to claim 1, further comprising making a fracturing fluid which includes 25 to 5,000 ppm of fracturing fluid (XX) in an aqueous liquid.

18. The method according to claim 1, wherein, at some stage in the method, one or a plurality of proppants is contacted with fracturing fluid (XX).

19. The method according to claim 1, wherein, at some stage in the method, said fracturing fluid (XX) or fracturing fluid (YY) includes 2.9 to 54 wt % of proppants.

20. A method of fracturing a subterranean formation, the method comprising contacting the formation with a fracturing fluid (YY) made in a method of claim 1.

21. An assembly positioned adjacent a subterranean formation and arranged to deliver a fracturing fluid (YY) as described in claim 1 into the subterranean formation, said assembly comprising:
(I) a receptacle containing a friction reducer formulation;
(II) a receptacle containing a booster formulation comprising an anionic surfactant (AS) and water;
(III) an aqueous liquid;
(IV) a pump (PI) for dosing said friction reducer formulation from said receptacle containing said friction reducer formulation to define at least part of the fracturing fluid (YY);
(V) a pump (P2) for dosing said booster formulation from said receptacle containing said booster formulation to define at least part of a fracturing fluid (YY);
(VI) a conduit for delivering fracturing fluid (YY) into the formation; and
(VII) a pump (P3) for injecting the fracturing fluid (YY) via said conduit into the formation.

22. The assembly according to claim 21, wherein said booster formulation comprises 40 to 70 wt % water.

23. The method according to claim 1, wherein said booster formulation comprises 40 to 70 wt % water.

* * * * *